(12) United States Patent
Nakajima et al.

(10) Patent No.: US 10,477,160 B2
(45) Date of Patent: Nov. 12, 2019

(54) INFORMATION PROCESSING APPARATUS, AND INFORMATION PROCESSING METHOD

(71) Applicant: CANON KABUSHIKI KAISHA, Tokyo (JP)

(72) Inventors: Masaki Nakajima, Utsunomiya (JP); Hiroto Yoshii, Utsunomiya (JP); Hiroshi Yoshikawa, Kawasaki (JP); Shinji Uchiyama, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 411 days.

(21) Appl. No.: 15/077,609

(22) Filed: Mar. 22, 2016

(65) Prior Publication Data

US 2016/0279809 A1 Sep. 29, 2016

(30) Foreign Application Priority Data

Mar. 27, 2015 (JP) ................................. 2015-067067

(51) Int. Cl.
*H04N 7/18* (2006.01)
*G06K 9/00* (2006.01)
*G01B 11/25* (2006.01)
*B25J 9/16* (2006.01)
*G06T 7/00* (2017.01)
(Continued)

(52) U.S. Cl.
CPC ............ *H04N 7/183* (2013.01); *B25J 9/1697* (2013.01); *G01B 11/25* (2013.01); *G06K 9/00201* (2013.01); *G06K 9/00664* (2013.01); *G06K 9/2036* (2013.01); *G06T 7/001* (2013.01); *G06T 7/254* (2017.01); *G06T 7/521* (2017.01); *G05B 2219/37555* (2013.01);
(Continued)

(58) Field of Classification Search
CPC ................................ H04N 7/183; G01B 11/25
See application file for complete search history.

(56) References Cited

U.S. PATENT DOCUMENTS

2006/0280358 A1* 12/2006 Ishikawa .......... G01N 21/95607
382/149
2012/0089364 A1* 4/2012 Takabayashi .......... G01B 11/25
702/167

(Continued)

FOREIGN PATENT DOCUMENTS

JP 2010-120141 A 6/2010

*Primary Examiner* — Rowina J Cattungal
(74) *Attorney, Agent, or Firm* — Canon U.S.A., Inc. IP Division

(57) ABSTRACT

An information processing apparatus having a changed region detection unit performs a process that includes repeating a cycle. The cycle includes causing a projection unit to project a pattern, that includes light and dark portions, onto target objects, causing an image capturing unit to capture an image of the target objects while the pattern is being projected by the projection unit, and causing a holding unit to hold one of the target objects based on a captured image obtained by the image capturing processing. Based on a reference boundary position corresponding to a boundary between the light and dark portions in the pattern in the captured image obtained in a previous cycle and a target boundary position in the captured image obtained in a current cycle, the changed region detection unit detects a changed region with a change between the previous cycle and the current cycle.

32 Claims, 19 Drawing Sheets

(51) Int. Cl.
G06T 7/521 (2017.01)
G06T 7/254 (2017.01)
G06K 9/20 (2006.01)

(52) U.S. Cl.
CPC .............. *G05B 2219/40053* (2013.01); *G06K 2209/19* (2013.01); *G06T 2207/30164* (2013.01); *Y10S 901/47* (2013.01)

(56) References Cited

U.S. PATENT DOCUMENTS

| | | | | |
|---|---|---|---|---|
| 2012/0133954 | A1* | 5/2012 | Takabayashi | G01B 11/2536 356/610 |
| 2013/0076896 | A1* | 3/2013 | Takabayashi | G01B 11/25 348/136 |
| 2013/0158947 | A1* | 6/2013 | Suzuki | G01B 11/00 702/155 |
| 2014/0168662 | A1* | 6/2014 | Takabayashi | G01B 11/2513 356/610 |
| 2014/0285816 | A1* | 9/2014 | Yamazaki | G01B 11/2509 356/610 |

* cited by examiner

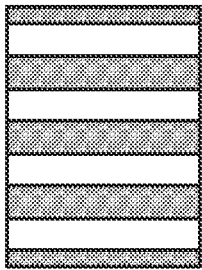
FIG.3A FULL-ILLUMINATION PATTERN
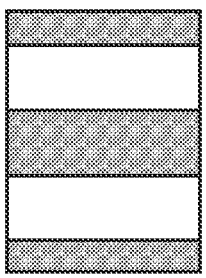
FIG.3B 1-BIT POSITIVE PATTERN
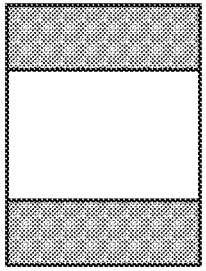
FIG.3C 2-BIT POSITIVE PATTERN
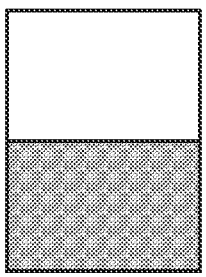
FIG.3D 3-BIT POSITIVE PATTERN
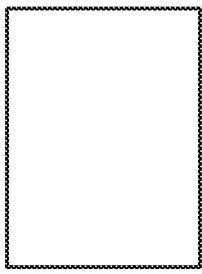
FIG.3E 4-BIT POSITIVE PATTERN
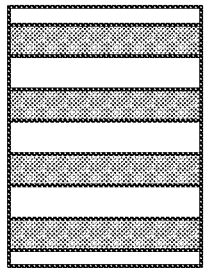
FIG.3F NO-ILLUMINATION PATTERN
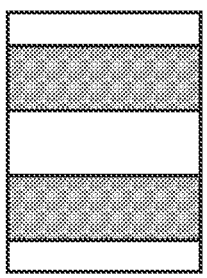
FIG.3G 1-BIT NEGATIVE PATTERN
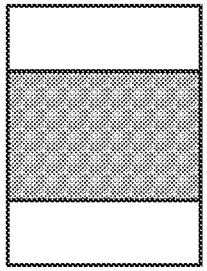
FIG.3H 2-BIT NEGATIVE PATTERN
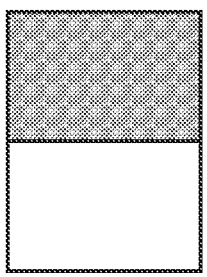
FIG.3I 3-BIT NEGATIVE PATTERN
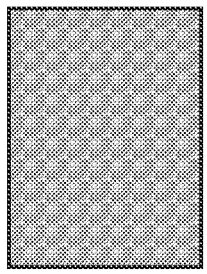
FIG.3J 4-BIT NEGATIVE PATTERN

FIG.4

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 1 BIT | 0 | 0 | 0 | 0 | 0 | 0 | 0 | 0 | 1 | 1 | 1 | 1 | 1 | 1 | 1 | 1 |
| 2 BIT | 0 | 0 | 0 | 0 | 1 | 1 | 1 | 1 | 1 | 1 | 1 | 1 | 0 | 0 | 0 | 0 |
| 3 BIT | 0 | 0 | 1 | 1 | 1 | 1 | 0 | 0 | 0 | 0 | 1 | 1 | 1 | 1 | 0 | 0 |
| 4 BIT | 0 | 1 | 1 | 0 | 0 | 1 | 1 | 0 | 0 | 1 | 1 | 0 | 0 | 1 | 1 | 0 |
| GRAY CODE | 0 | 1 | 3 | 2 | 6 | 7 | 5 | 4 | 12 | 13 | 15 | 14 | 10 | 11 | 9 | 8 |
| SPATIAL CODE | 0 | 1 | 2 | 3 | 4 | 5 | 6 | 7 | 8 | 9 | 10 | 11 | 12 | 13 | 14 | 15 |

WHEN SECOND DISTANCE DATA INCLUDES INTERSECTING POSITION, SEARCH IS PERFORMED ALTERNATELY ON LEFT AND RIGHT PIXELS OF THE INTERSECTING POSITION, SERVING AS START POINT, ON PIXEL BY PIXEL BASIS TO DETERMINE NEAREST NEIGHBOR INTERSECTING POSITION

▨ : WITH MEASUREMENT LINE POSITION DATA

☐ : WITH NO MEASUREMENT LINE POSITION DATA

WORKPIECE THAT CAN BE
PICKED UP EXTRACTED IN STEP S105
(WORKPIECE ILLUSTRATED WITH BOLD LINE)

CHANGED REGION
DETECTED IN STEP S109

THERE IS NO WORKPIECE THAT CAN BE
PICKED UP OUTSIDE CHANGED REGION

WORKPIECE THAT CAN BE
PICKED UP EXTRACTED IN STEP S105
(WORKPIECE ILLUSTRATED WITH BOLD LINE)

CHANGED REGION
DETECTED IN STEP S109

THERE IS WORKPIECE THAT CAN BE
PICKED UP OUTSIDE CHANGED REGION

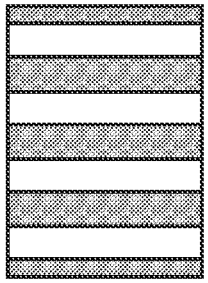
FIG. 13E 4-BIT POSITIVE PATTERN
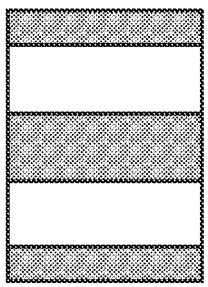
FIG. 13D 3-BIT POSITIVE PATTERN
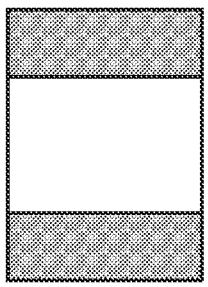
FIG. 13C 2-BIT POSITIVE PATTERN
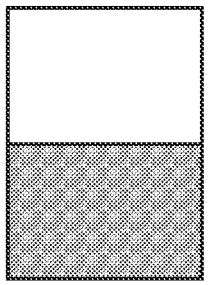
FIG. 13B 1-BIT POSITIVE PATTERN
FIG. 13G MULTI-SLIT LIGHT PATTERN
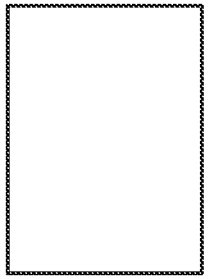
FIG. 13A FULL-ILLUMINATION PATTERN
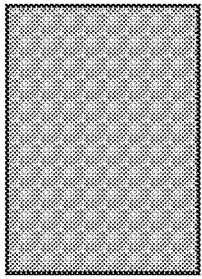
FIG. 13F NO-ILLUMINATION PATTERN

FIG. 18

| | STEP S103 (WHEN THREE-DIMENSIONAL SHAPE DATA IS ACQUIRED) | STEP S108 (WHEN CHANGED REGION IS DETECTED) |
|---|---|---|
| 1-BIT POSITIVE IMAGE | | |
| 1-BIT NEGATIVE IMAGE | USE IMAGES CAPTURED IN STEP S101 (WHEN THREE-DIMENSIONAL SHAPE DATA IS ACQUIRED) | USE IMAGES CAPTURED IN STEP S101 (WHEN THREE-DIMENSIONAL SHAPE DATA IS ACQUIRED) |
| 2-BIT POSITIVE IMAGE | | |
| 2-BIT NEGATIVE IMAGE | USE IMAGES CAPTURED IN STEP S101 (WHEN THREE-DIMENSIONAL SHAPE DATA IS ACQUIRED) | USE IMAGES CAPTURED IN STEP S101 (WHEN THREE-DIMENSIONAL SHAPE DATA IS ACQUIRED) |
| 3-BIT POSITIVE IMAGE | | |
| 3-BIT NEGATIVE IMAGE | USE IMAGES CAPTURED IN STEP S101 (WHEN THREE-DIMENSIONAL SHAPE DATA IS ACQUIRED) | USE IMAGES CAPTURED IN STEP S107 (WHEN CHANGED REGION IS DETECTED) |
| 4-BIT POSITIVE IMAGE | | |
| 4-BIT NEGATIVE IMAGE | USE IMAGES CAPTURED IN STEP S101 (WHEN THREE-DIMENSIONAL SHAPE DATA IS ACQUIRED) | USE IMAGES CAPTURED IN STEP S101 (WHEN THREE-DIMENSIONAL SHAPE DATA IS ACQUIRED) |

INFORMATION PROCESSING APPARATUS, AND INFORMATION PROCESSING METHOD

BACKGROUND OF THE INVENTION

Field of the Invention

The present invention relates to a randomly piled parts pick-up apparatus that takes out a part with a robot, and to a control method for the apparatus.

Description of the Related Art

A randomly piled parts pick-up apparatus is an apparatus that recognizes a position and an orientation of each individual part (hereinafter, referred to as workpieces) from parts and the like that are randomly piled in an overlapping manner, and takes out the workpieces one by one with a robot. An operation of taking out a workpiece is hereinafter, referred to as "pick-up operation".

The randomly piled parts pick-up apparatus mainly includes a three-dimensional shape measurement device and a pick-up robot. Base on distance information obtained by the three-dimensional shape measurement device, the randomly piled parts pick-up apparatus recognizes the position and the orientation of a workpiece that can be grasped, and notifies the pick-up robot of the position and the orientation. The pick-up robot picks up the workpiece from the randomly piled parts based on the information on the position and the orientation thus notified. The randomly piled parts pick-up apparatus needs to complete a cycle of a series of operations, including an operation of measuring a three-dimensional shape of the randomly piled parts, an operation of recognizing and notifying the position and the orientation of a workpiece, and an operation of picking up the workpiece, in a short period of time.

Some randomly piled parts pick-up apparatuses include a camera that captures a scene indicating a state of randomly piled workpieces, in addition to the three-dimensional measurement device, and achieves a pick-up cycle completed in a shorter period of time in the following manner. More specifically, after the pick-up operation is performed and before the three dimensional measurement of randomly piled parts is performed again, a two-dimensional image that represents the state of the randomly piled parts and is captured by the camera is acquired. Then, this two-dimensional image is compared with a two-dimensional image that represents the scene of the randomly piled workpieces and is captured after the pick-up operation in the previous cycle. Thus, whether there is a workpiece with no change in the position and the orientation exceeding an allowable range is determined. When there is the workpiece with no change exceeding the allowable range, the workpiece is picked up with no three-dimensional measurement performed.

However, the method discussed in Japanese Patent Application Laid-Open No. 2010-120141 has an issue in that changes in a height direction cannot be detected because the detection of changes in the position and orientation of the workpiece depends on two-dimensional images.

SUMMARY OF THE INVENTION

According to an aspect of the present invention, an information processing apparatus configured to perform a process that includes repeating a cycle, wherein the cycle includes executing projection processing of causing a projection unit to project a pattern, that includes light and dark portions, onto a plurality of target objects, executing image capturing processing of causing an image capturing unit to capture an image of the plurality of target objects while the pattern is being projected by the projection unit, and causing a holding unit to hold one of the plurality of target objects based on a captured image obtained by the image capturing processing, includes a changed region detection unit configured to detect, based on a reference boundary position corresponding to a boundary between the light and dark portions in the pattern in the captured image obtained in a previous cycle and a target boundary position in the captured image obtained in a current cycle, a changed region with a change between the previous cycle and the current cycle.

With the present invention, a change in a position and an orientation of a workpiece in a height direction can be detected.

Further features of the present invention will become apparent from the following description of exemplary embodiments with reference to the attached drawings.

BRIEF DESCRIPTION OF THE DRAWINGS

FIGS. 3A, 3B, 3C, 3D, 3E, 3F, 3G, 3H, 3I, and 3J are diagrams illustrating a 4-bit spatially coded pattern.

FIG. 4 is a diagram illustrating 4-bit Gray code and spatial code values.

FIGS. 13A, 13B, 13C, 13D, 13E, 13F, and 13G are diagrams illustrating an example of pattern light beams projected in the multi-slit light projection method.

FIG. 18 is a diagram illustrating a difference between image data used in step S103 and image data used in step S108.

DESCRIPTION OF THE EMBODIMENTS

Figure 1:
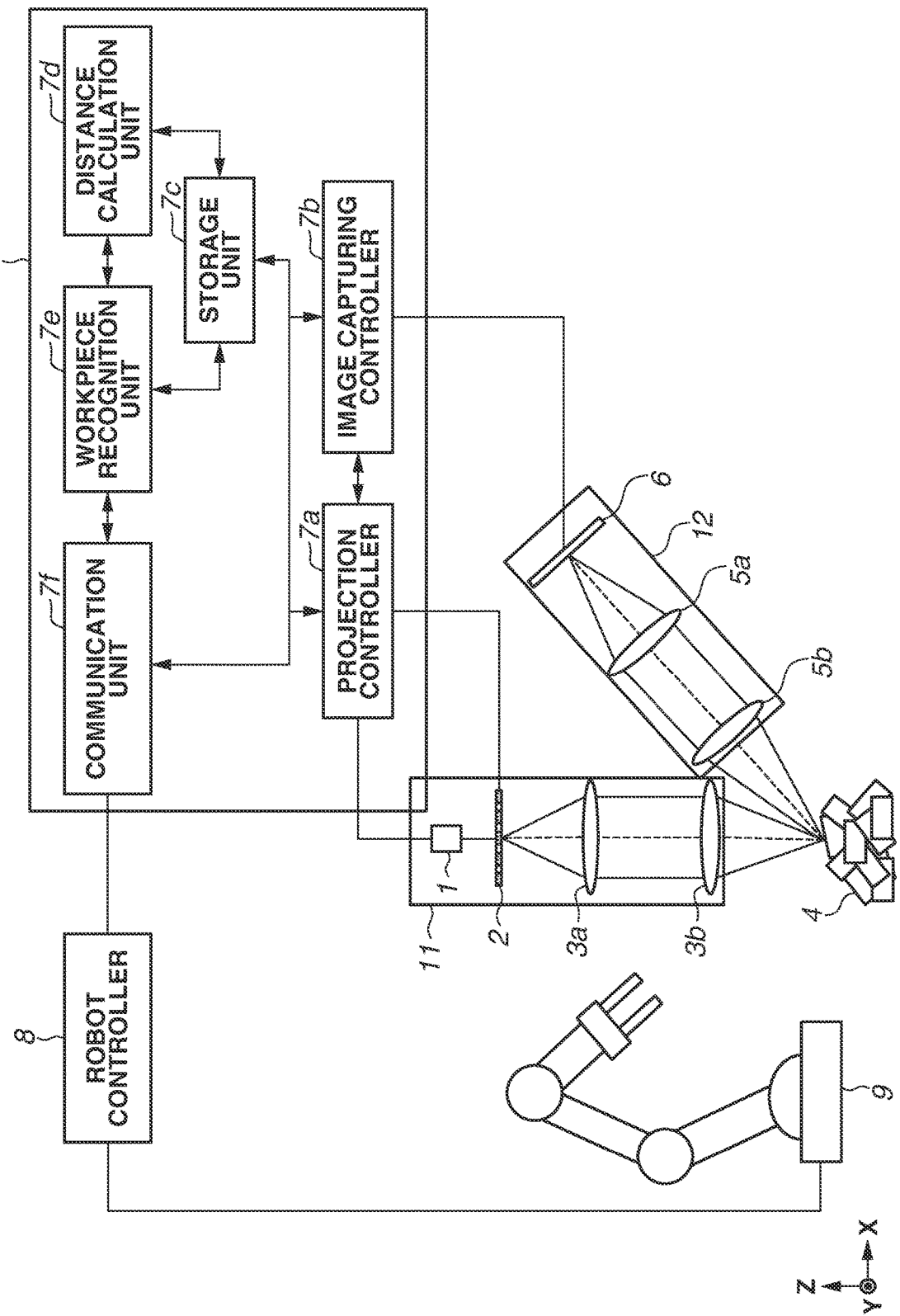
FIG. 1 is a diagram illustrating a shape measurement apparatus according to the present invention.

A first exemplary embodiment of an information processing apparatus according to the present invention is described. FIG. 1 illustrates an example of a system using an information processing apparatus 7 according to the present invention.

The information processing apparatus 7 according to the present invention shortens a time period required for acquiring distance data by using distance data acquired when a pick-up operation is performed in the previous cycle.

More specifically, in the previous cycle, second distance data is acquired, by projecting a plurality of patterns, and is stored. Then, in the current cycle, third distance data is acquired by projecting patterns that are less than those projected in the previous cycle, and the second distance data is compared with the third distance data, whereby a changed region is accurately detected. In the first exemplary embodiment, data stored as data of a boundary position between light and dark portions in a pattern, is used as the distance data.

The information processing apparatus 7 according to the first exemplary embodiment is connected to a projection unit 11, an image capturing unit 12, and a robot controller 8 that controls an operation of picking up a workpiece 4 (target object).

The projection unit 11 includes a light source 1 that emits a light beam, a pattern generation unit 2 that can generate a pattern projected onto a subject and modulate the pattern, and projection lenses 3a and 3b that irradiate a space, in which a plurality of workpieces 4 is randomly piled, with a pattern light beam.

The light source 1 emits the light beam and includes a light emitting diode (LED) or the like for example. The light source 1 irradiates the pattern generation unit 2 with light.

The pattern generation unit 2 generates the lattice pattern including the light and the dark portions that are periodically arranged. For example, the pattern generation unit 2 may use a mask pattern in which light shielded and light unshielded portions are regularly arranged. Still, when a liquid crystal element, a digital mirror device (DMD), or the like is used, a desired pattern, such as a monochrome pattern and a sinusoidal pattern, can be generated. The light beam that has the lattice pattern, as a result of passing through the pattern generation unit 2, enters the projection lenses 3a and 3b. The workpiece 4 is irradiated with the pattern light beam emitted from the projection lens 3b, and thus the pattern generated by the pattern generation unit 2 is projected onto the workpieces 4.

The image capturing unit 12 includes focus lenses 5a and 5b that focus the pattern light beam reflected from the workpiece 4 and an image sensor 6 that acquires an intensity of the pattern light beam diffused/reflected from the workpiece 4. The pattern light beam reflected and diffused from the workpiece 4 enters the focus lenses 5a and 5b, whereby an image corresponding to the pattern light beam, emitted on the workpiece 4, is formed on the image sensor 6. The image sensor 6, such as a charged-coupled device (CCD) or a complementary metal-oxide-semiconductor (CMOS) sensor, detects light intensity of the image, corresponding to the pattern light beam, thus formed.

The robot controller 8 receives position and orientation information of the workpiece 4 from the information processing apparatus 7, and thus controls a robot 9 so that the robot 9 picks up the workpiece 4 the position and the orientation of which are recognized.

The robot 9 picks up the workpiece 4 based on control information from the robot controller 8.

The information processing apparatus 7 has the following configuration.

A projection controller 7a controls the projection, performed by the projection unit 11, by adjusting light emitted by the light source 1 and the projection pattern generated by the pattern generation unit 2.

An image capturing controller 7b controls image capturing performed by the image capturing unit 12 by adjusting exposure time and the like of the image sensor 6 and performing image capturing.

A storage unit 7c stores a captured image and a distance calculation result.

A distance calculation unit 7d calculates a distance to the workpiece 4 from the stored image.

A workpiece recognition unit 7e recognizes the workpiece 4 from measured first distance data and shape data of the workpiece 4 stored in the storage unit 7c in advance. More specifically, the workpiece recognition unit 7e calculates the position and the orientation of the workpiece 4 that can be picked up by the robot 9, stores the resultant position and orientation information in the storage unit 7c, and transmits the position and orientation information to the robot controller 8 through a communication unit 7f.

The communication unit 7f transmits the position/orientation information of the workpiece thus recognized to the robot controller 8.

Each functional unit of the information processing apparatus 7 is implemented by a central processing unit (CPU) 1910 by loading a program stored in a read only memory (ROM) 1920 onto a random access memory (RAM) 1930, and by executing processing corresponding to each flowchart described below. For example, hardware may be formed, instead of executing software processing with the CPU 1910, by forming arithmetic units or circuits each corresponding to processing of the corresponding functional unit described here.

The robot controller 8 operates the robot 9, having a hand that can grasp the workpiece 4, so that the robot 9 picks up the workpieces 4 that are randomly piled, based on the received position and orientation information of the workpiece 4 that can be grasped.

The robot 9 has the robot hand that can grasp (hold) the workpiece 4, and is controlled by the robot controller 8 and thus picks up the workpieces 4 that are randomly piled. The robot 9 is a multi-joint robot in the present exemplary embodiment. However, this should not be construed in a limiting sense, and a robot in any form may be employed as long as the workpiece 4 can be picked up and relocated. A robot hand that is suitable for grasping may be used in accordance with the shape of the workpiece 4. For example, an opening and closing hand with two or three fingers or a hand using attraction force may be used.

A processing flowchart according to the first exemplary embodiment is described with reference to FIG. 2.

In the present exemplary embodiment, an example is described where a plurality of workpieces 4 that are randomly piled is sequentially picked up by the robot 9. Steps S101 to S106 represent one pick-up cycle (a process of picking up one workpiece 4), and steps S107 to S109 represent a next pick-up cycle (a process of picking up the next workpiece 4).

First of all, in step S101, the projection unit 11 projects a pattern light beam, for acquiring the first distance data, onto the randomly piled workpieces 4. While the pattern light beam is being projected by the projection unit 11, the image capturing unit 2 captures a scene where the workpieces 4 are randomly piled, whereby a pattern light intensity image, required for acquiring the first distance data, is acquired. Thus, the pattern light intensity image is obtained by capturing an image of a state of the workpieces 4 on which a certain pattern is projected. Here, when the first distance data is acquired with a spatial coding pattern projection method for example, a plurality of patterns, as illustrated in FIGS. 3A to 3J, is sequentially projected. The image capturing unit 2 sequentially captures images with the respective patterns projected (image acquisition). In this example, a spatially coded pattern projection method using a 4-bit Gray code pattern is employed. Thus, the light emitted from the projection unit 11 can be divided into $2^4$ (=16). A larger number of bits has an advantage in that the emitted light can be divided by a larger number, although needing a larger number of projected patterns. For example, when a 10-bit Gray code pattern is used, the emitted light can be divided into $2^{10}$ (=1024), whereby more detailed shape measurement can be achieved with the scene more finely divided. In the present exemplary embodiment, a plurality of patterns is sequentially projected as described above, and thus a plurality of the pattern light intensity images is acquired.

Then, in step S102, the distance calculation unit 7d calculates the first distance data from the plurality of pattern light intensity images acquired in step S101. A case is described where the spatially coded pattern projection method is used as a method of acquiring the first distance data.

In the spatially coded pattern projection method, light/dark determination is performed with luminance information of the pattern light intensity image corresponding to each bit, and a spatial code is assigned to each predetermined region in an image capturing range. For example, the light/dark determination for a 1-bit image is performed as follows. More specifically, in a pixel of the pattern light intensity image, corresponding to a positive pattern image illustrated in FIG. 3B, and the corresponding same pixel in the pattern light intensity image corresponding to a negative pattern image illustrated in FIG. 3G, their image luminance values are compared. A code 1 is assigned when the pattern light intensity image corresponding to the positive pattern has a high luminance, and a code 0 is assigned when the pattern light intensity image corresponding to the positive pattern has a low luminance. FIG. 4 illustrates spatial codes assigned by performing the determination to the 1 to 4 bit-pattern light intensity images. Then, the shape of the workpiece 4 is calculated from the spatial codes thus assigned and a geometrical relationship between the projection unit 11 and the image capturing unit 12.

Next, in step S103, the distance calculation unit 7d calculates second distance data from the pattern light intensity images acquired in step S101. The second distance data according to the present exemplary embodiment is obtained only with respective pattern light intensity images corresponding to 4-bit positive and negative patterns illustrated in FIGS. 3E and 3J.

Figure 5:
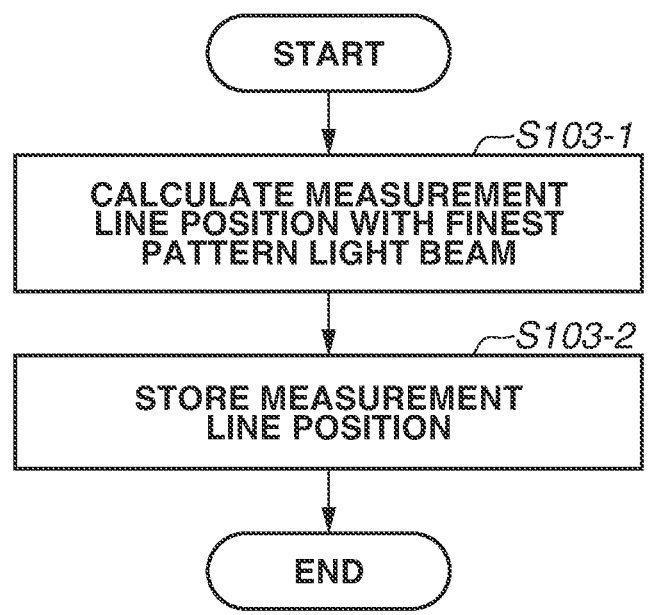
FIG. 5 is a diagram illustrating a method of calculating second distance data according to a first exemplary embodiment.

A method of calculating the second distance data is illustrated in FIG. 5. First of all, in step S103-1, the distance calculation unit 7d calculates a measurement line position from pattern light intensity images corresponding to a finest pattern light beam (4-bit positive and negative patterns) in the pattern light beams projected in step S101. The measurement line position is the boundary position between the light and the dark portions of the pattern in the pattern light intensity image.

Figure 6:
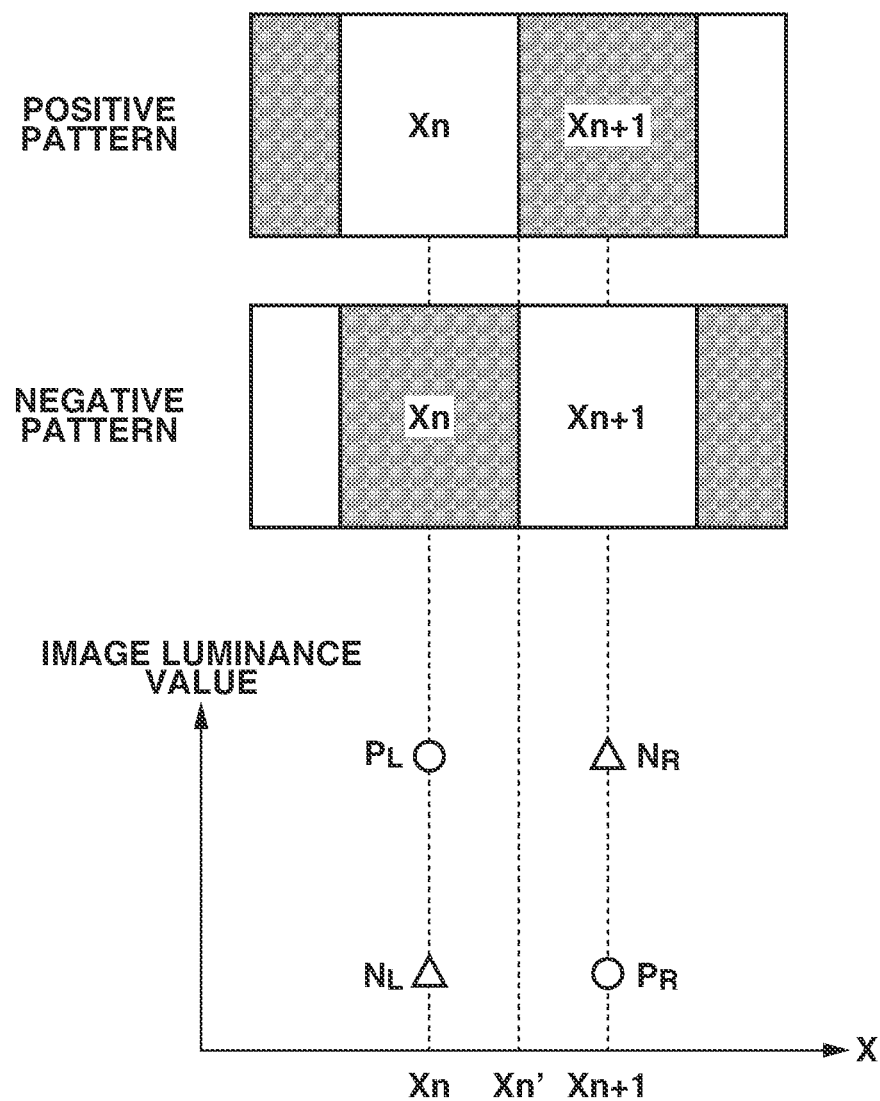
FIG. 6 is a diagram illustrating a measurement line position obtained from image luminance waveforms.

For example, when the pattern projection and the image capturing are performed with the 4-bit patterns illustrated in FIGS. 3A to 3J for acquiring the first distance data in step S101, an intersecting position between image luminance waveforms is calculated as the measurement line position, from the respective pattern light intensity images corresponding to the 4-bit positive and negative patterns illustrated in FIGS. 3E and 3J. FIG. 6 illustrates the intersecting position between the image luminance waveforms. This intersecting position Xn' between the image luminance waveforms is an intersecting position between a straight line connecting between $P_L$ and $P_R$ and a straight line connecting between $N_L$ and $N_R$ and can be represented by the following formula:

$$Xn' = \frac{\text{abs}(P_L - N_L)}{\text{abs}(P_L - N_L) + \text{abs}(P_R - N_R)}, \quad (1)$$

where $P_L$, $P_R$, $N_L$, and $N_R$ represent luminance values of a pixel Xn and a pixel Xn+1 in the positive pattern and luminance values of the pixel Xn and the pixel Xn+1 in the negative pattern that are in the projected images corresponding to the least significant bit.

By thus calculating the intersecting position Xn' between the image luminance waveforms of the positive and the negative patterns, a difference amount of a projected pattern due to the height of the workpieces 4 can be detected with an accuracy of one pixel or less, and thus the shape of the workpiece 4 can be accurately measured. The intersecting position of the image luminance waveforms is calculated at the boundary portions between the light and the dark portions over the entire image. Thus, the measurement line positions are measured over the entire image capturing region.

The second distance data that is acquired separately from the first distance data as described in the present exemplary embodiment, may also be acquired when the first distance data is calculated. That is, the second distance data may be acquired when the codes are assigned to the 4-bit pattern light intensity image in step S102.

The distance calculation unit 7d stores the measurement line position data, calculated over the enter image in step S103-1, in the storage unit 7c.

Next, in step S104, the workpiece recognition unit 7e calculates positions and orientations of a plurality of randomly piled workpieces 4 by executing matching processing or the like, using the first distance data of the randomly piled workpieces 4 calculated in step S102 and shape data of the workpieces 4 such as computer aided design (CAD) data stored in the storage unit 7c in advance (multiple determination).

Next, in step S105, the workpiece recognition unit 7e determines whether there is a workpiece 4 that can be picked up by the robot 9 by using the position and orientation information of the plurality of workpieces 4 recognized in step S104, the first distance data of the randomly piled workpieces 4, calculated in step S102, and shape data of the robot hand stored in advance in the storage unit 7c.

More specifically, the workpiece recognition unit 7e determines whether the robot hand picking up a pick-up target candidate workpiece interferes with a peripheral workpiece 4 or installed object, from a data area of the workpiece 4 (hereinafter, referred to as a pick-up target candidate workpiece) the position and the orientation of which have been recognized, periphery shape data, and the shape data of the robot hand. The pick-up target candidate workpiece involving no interference is determined as the workpiece 4 that can be picked up. The position and the orientation of the workpiece that can be picked up by the robot 9, in the pick-up target candidate workpieces, are extracted. When there is a workpiece 4 that can be picked up by the robot 9, the workpiece recognition unit 7e transmits the position and orientation information of this workpiece 4, to the communication unit 7f. Then, the communication unit 7f transmits the position and the orientation of one workpiece 4 that can be picked up to the robot controller 8, and the processing proceeds to step S105. When there is a plurality of workpieces 4 that can be picked up (yes in step S105), the workpiece 4 that is less likely to interfere with the peripheral workpiece 4 and installed object is selected. When there is no workpiece 4 that can be picked up by the robot 9 (no in step S105), the processing returns to step S101. Here, an operation of changing the randomly piled state, such as an operation of stirring the random pile workpieces 4, may be performed.

Next, in step S106, the robot controller 8 controls the robot 9 based on the position and orientation information of the workpiece 4 that can be picked up by the robot 9, transmitted from the communication unit 7f in step S105, whereby the workpiece 4 is picked up.

Next, in step S107, the projection unit 11 projects the pattern light beam, for acquiring third distance data, on the scene in which the workpieces 4 are randomly piled, and the image capturing unit 12 performs the image capturing. The third distance data is acquired by projecting a finest pattern light beam in the pattern light beams projected in step S101. For example, when the patterns illustrated in FIGS. 3A to 3J have been projected in step S101, the pattern light intensity images are captured by projecting only the respective 4-bit positive and negative patterns, illustrated in FIGS. 3E and 3J, on the randomly piled workpieces 4. Thus, while the 10 patterns are projected and thus 10 pattern images are captured for acquiring the first distance data in step S101, pattern projection and image capturing need to be performed only with the respective two 4-bit positive and negative patterns illustrated in FIGS. 3E and 3J, in step S107. Thus, the pattern projecting and the image capturing can be completed in one fifth of the time required for those in step S101.

Next, in step S108, the distance calculation unit 7d calculates the third distance data from the pattern light intensity images, for acquiring the third distance data, acquired in step S107, as in step S103, that is, through the processing that is similar to that in step S103. Thus, the measurement line position is obtained.

Figure 7:
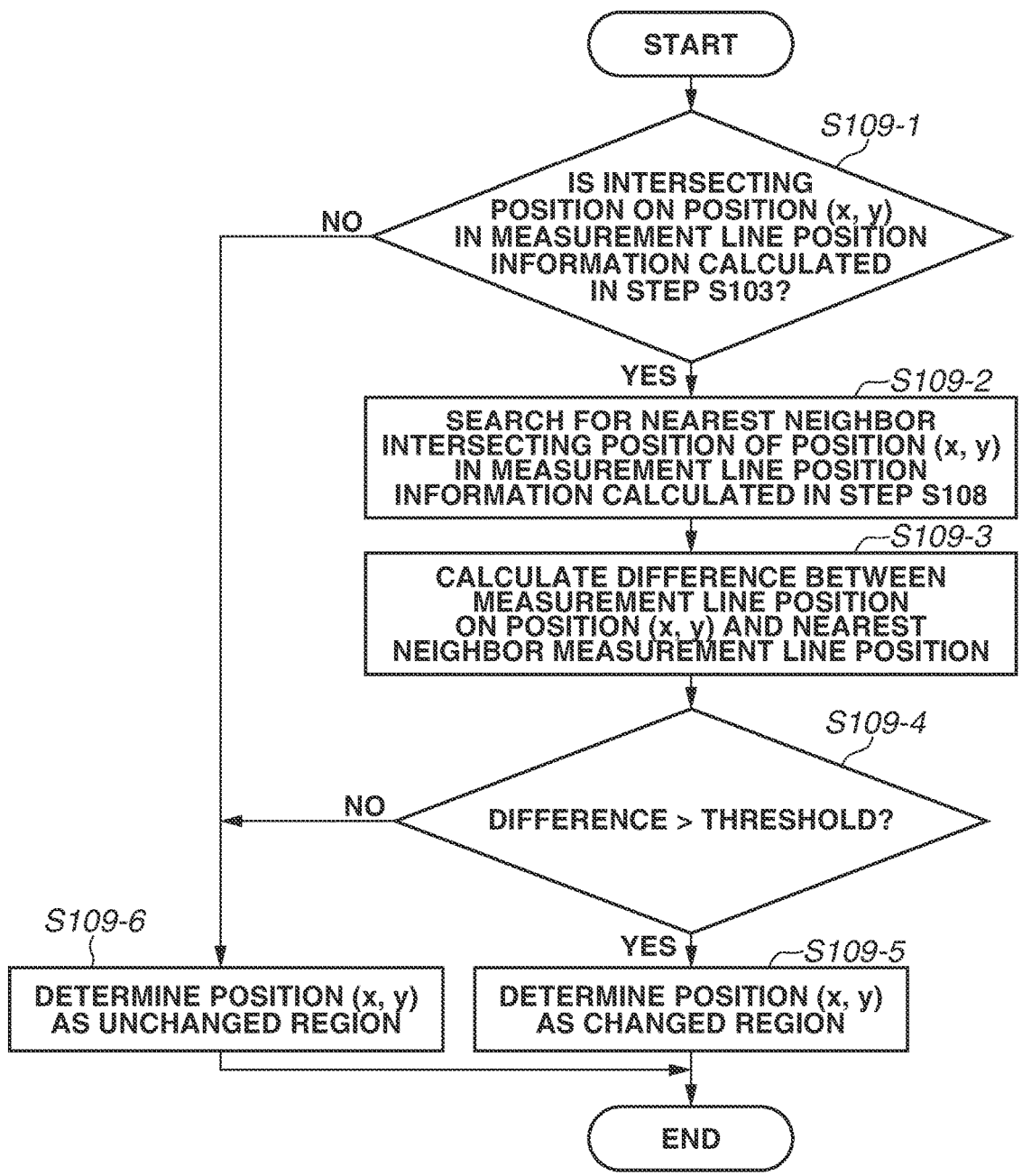
FIG. 7 is a diagram illustrating a method of detecting a change according to the first exemplary embodiment.
Figure 8:
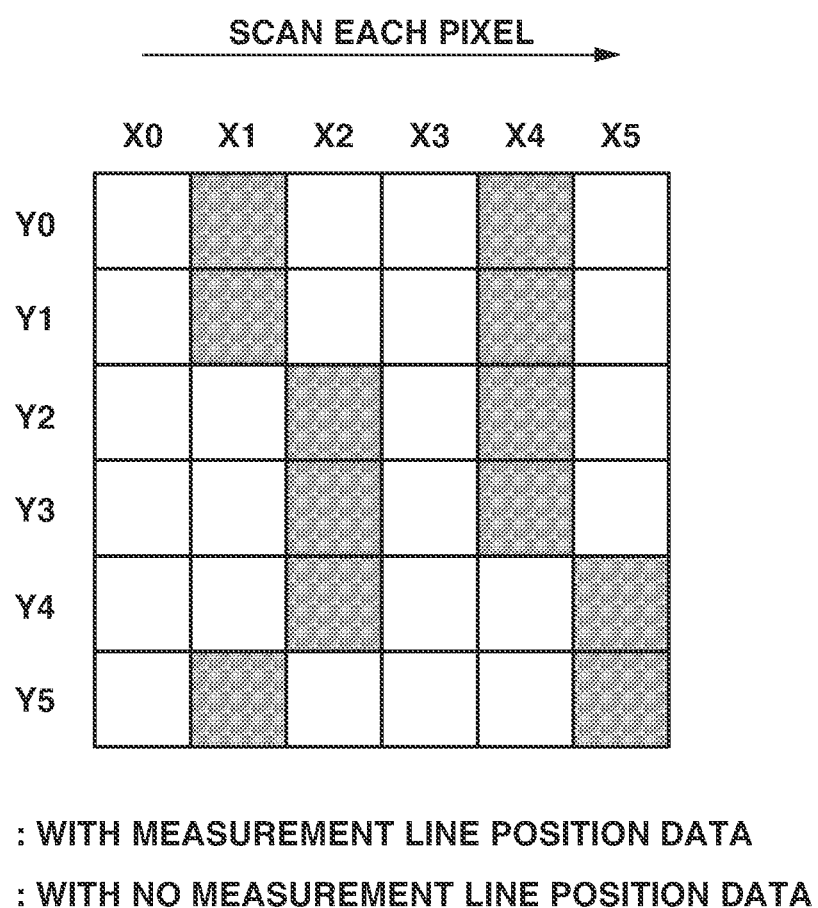
FIG. 8 is a diagram illustrating an example of measurement line information calculated in step S103.

Next, in step S109, the workpiece recognition unit 7e detects the change in the randomly piled workpieces 4 between states before and after the picking up in step S106, from the second distance data calculated in step S103 and the third distance data calculated in step S108. FIG. 7 illustrates a method of detecting the change in the randomly piled workpieces 4 between the states before and after the picking up according to the present exemplary embodiment. Whether there is measurement line position data is sequentially determined for pixels in the second distance data starting from a starting point. When there is the measurement line position data, the second distance data and the third distance data are compared with each other in the intersecting position, and thus the changed region is detected. First of all, in step S109-1, the workpiece recognition unit 7e determines whether there is the measurement line position data at each pixel in the second distance data, calculated in step S103. For example, when the measurement line position data is not at a position (X0,Y0) in the second distance data as illustrated in FIG. 8 (no in step S109-1), the processing proceeds to step S109-6 in which the workpiece recognition unit 7e determines that the position (X0,Y0) is an unchanged region.

Then, when there is the intersecting position information of the image luminance waveforms at the next pixel, that is, at a position (X1,Y0) (yes in step S109-1), the processing proceeds to step S109-2.

Figure 9:
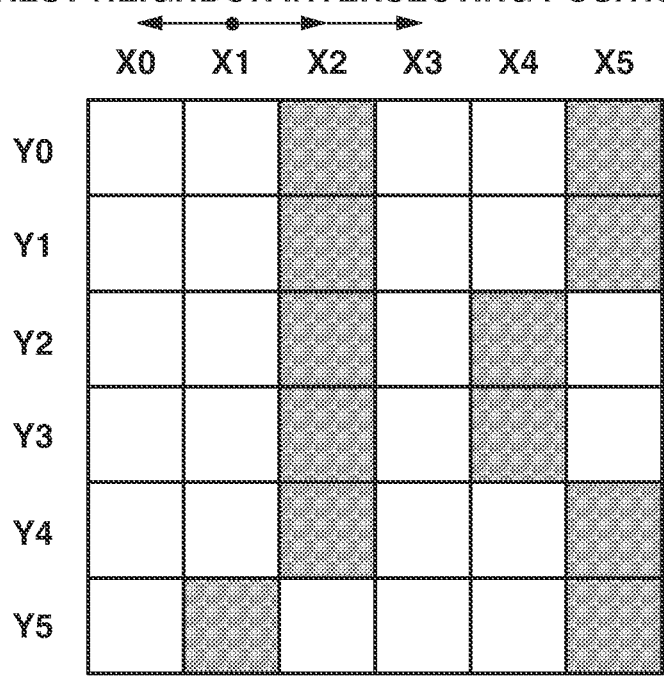
FIG. 9 is a diagram illustrating an example of measurement line information calculated in step S108.

Next, in step S109-2, the workpiece recognition unit 7e searches for nearest neighbor measurement line position data of the position (X1,Y0) in the third distance data calculated in step S108. For example, the search is alternately performed on the left and the right pixels of the position (X1,Y0), serving as the starting point with the measurement line in the second distance data, on a pixel by pixel basis, whereby the nearest neighbor line position is determined. As illustrated in FIG. 9, raster scan is performed with the position (X1,Y0) in the third distance data serving as the starting point. In the example illustrated in FIG. 9, intersecting position information at the position (X2,Y0) is the nearest neighbor measurement line position data.

Next, in step S109-3, the workpiece recognition unit 7e calculates the difference between the measurement line position data at the position (X1,Y0) in the second distance data and the nearest neighbor measurement line position data of the position (X1,Y0) in the third distance data. More specifically, a difference value Δ between measurement line position data P1 at the position (X1,Y0) illustrated in FIG. 8 and corresponding measurement line position data P2 at the position (X2,Y0) illustrated in FIG. 9 is calculated.

Next, in step S109-4, the workpiece recognition unit 7e determines whether the difference value Δ of the measurement line position data, calculated in step S109-3, is larger than a threshold set in advance. When the difference value Δ of the measurement line position data is larger than the threshold (yes in step S109-4), the processing proceeds to step S109-5, in which the workpiece recognition unit 7e determines that there is a change as a result of the picking up at the position (X1,Y0) in the second distance data. On the other hand, when the difference value Δ of the measurement line position data is equal to or smaller than the threshold (no in step S109-4), the processing proceeds to step S109-6, in which the workpiece recognition unit 7e determines that there is no change as a result of the pick-up operation at the position (X1,Y0) in the second distance data. The processing from step S109-1 to S109-6 is executed on all the pixels in the second distance data, whereby the changed region, in the region of the randomly piled workpieces 4, with a change as a result of the pick-up operation in step S106 can be detected. The threshold in step S109-4 is preferably set in such a manner that only the change in the distance as a result of picking up the workpiece 4 is regarded as the change. More specifically, the threshold is set in such a manner that a change in the measurement line position, caused by a change in the image luminance value due to noise and the like of the image sensor or the like, is not detected as the change, and the change in the measurement line position as a result of picking up the workpiece 4 is detected as the change. For example, the threshold is set as a value that is equal to or larger than a smallest value of each side of a circumscribed rectangle of the randomly piled workpieces 4 and is larger than a change, in the measurement line position, due to the noise of the image sensor and the like in the second distance data.

Figure 10A:
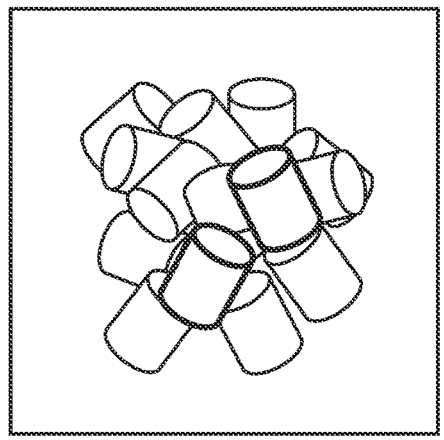
FIGS. 10A, 10B, and 10C are diagrams illustrating an example of processing of determining whether there is a workpiece that can be picked up, based on information on a changed region.
Figure 10B:
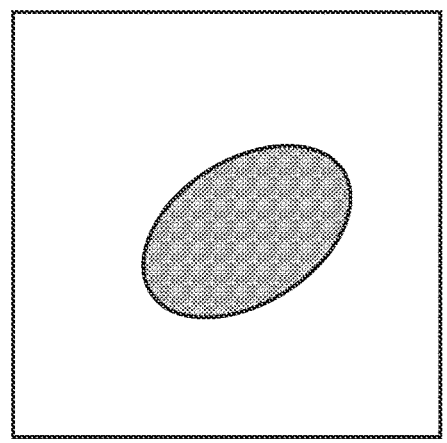
Figure 10C:
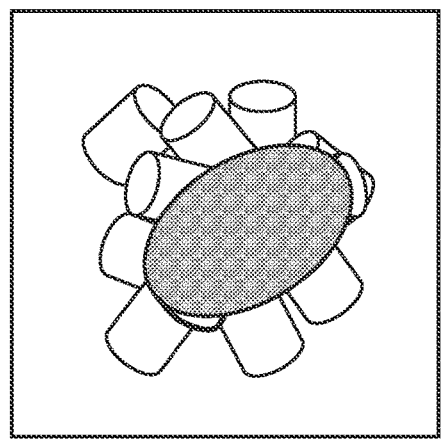

Then, the processing returns to step S105 again. In step S105, the workpiece recognition unit 7e determines whether there is the workpiece 4 that can be picked up (held), based on the position and the orientation of the workpiece 4 that can be picked up that has been extracted in step S105 before the pick-up operation, and the information on the region that has changed as a result of the pick-up operation calculated in step S109. When the region with no change as a result of the pick-up operation includes no workpiece 4 that can be picked up as illustrated in FIG. 10C (no in step S105), the processing returns to step S101, and the processing in the steps is repeated. Here, the processing may return to step S101 after the operation of changing the random pile state of the workpieces 4 and the like is performed.

Figure 11A:
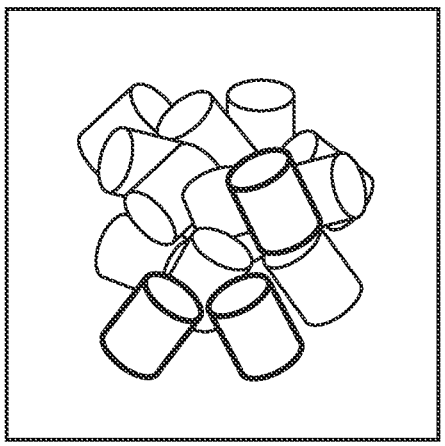
FIGS. 11A, 11B, and 11C are diagrams illustrating an example of the processing of determining whether there is a workpiece that can be picked up, based on the information on the changed region.
Figure 11B:
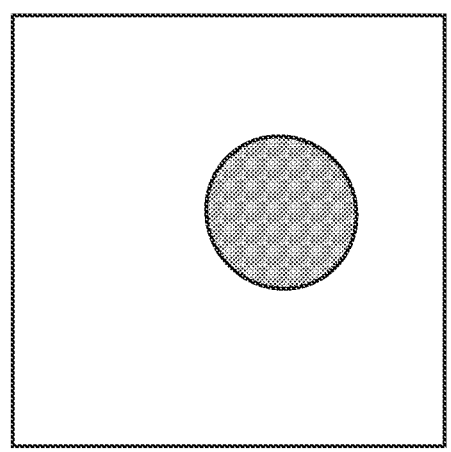
Figure 11C:
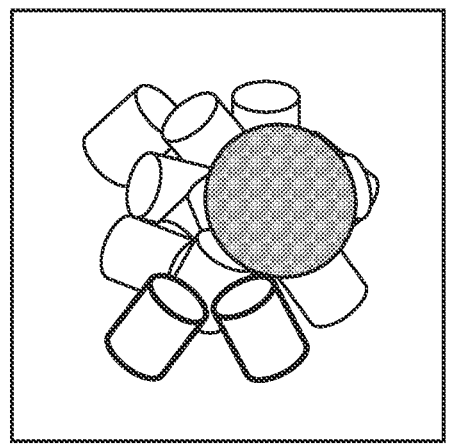

On the other hand, when the region with no change as a result of the pick-up operation includes the workpiece 4 that can be picked up as illustrated in FIG. 11C, the processing does not return to step S101, and the pick-up operation is performed again with the position and orientation information of the workpiece 4 that can be picked up that has been extracted in step S105 before the pick-up operation, transmitted to the robot controller 8. For example, the position and the orientation of one of the workpieces 4 illustrated with bold lines in FIG. 11C is transmitted to the robot controller 8. Thus, the number of times of the processing in steps S101 and S102, requiring a longer time than the processing in steps S107 and S108 can be reduced, whereby the pick-up cycle that can be completed in a shorter period of time can be achieved. The processing in the present invention is different from the method discussed in Japanese Patent Application Laid-Open No. 2010-120141 in that the change in the height information is detected. Thus, no pick up failure occurs even when some of the randomly piled workpieces 4 are in the same orientation and are stacked in the height direction at the same position in the captured image. Thus, the pick-up cycle that can be completed in a shorter period of time can be achieved.

Figure 12:
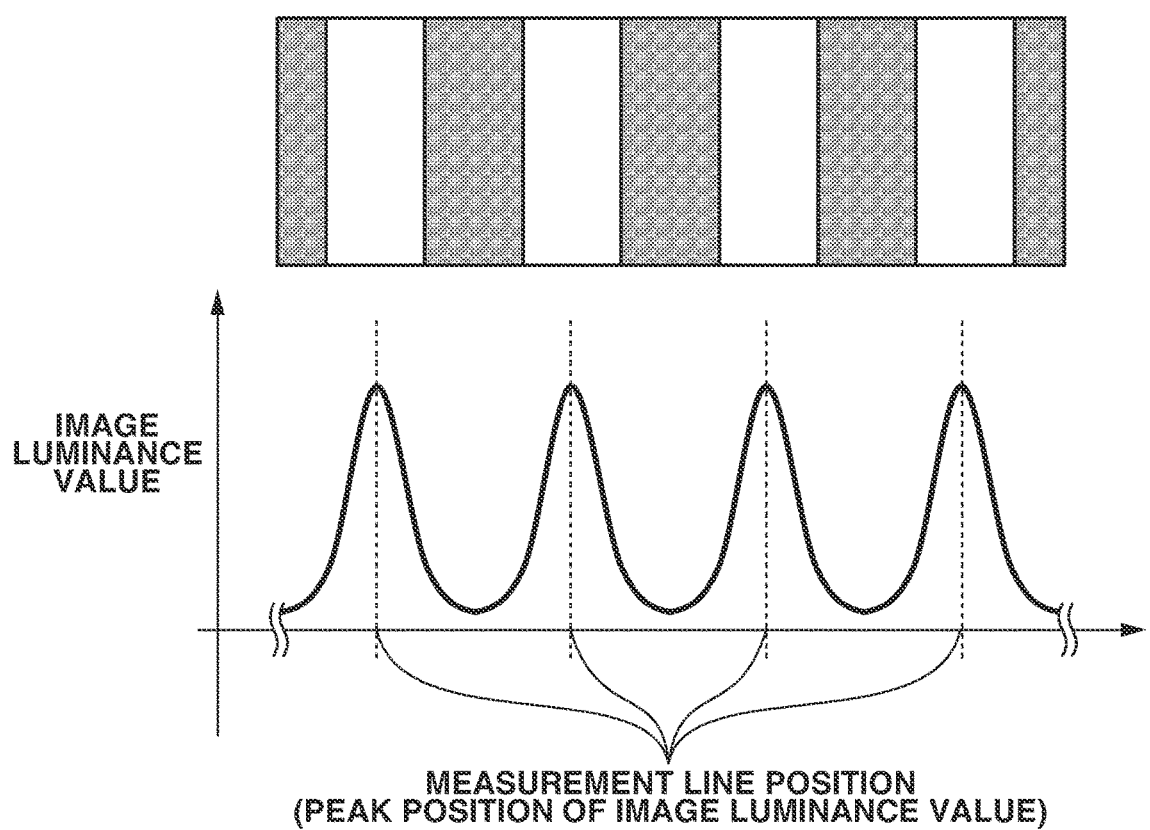
FIG. 12 is a diagram illustrating a measurement line position in a multi-slit light projection method.

In the present exemplary embodiment, the third distance data is acquired by acquiring the two positive and negative pattern light intensity images corresponding to the finest pattern light beams in the pattern light beams projected for calculating the first distance data. Alternatively, only one of the positive and negative pattern light intensity images may be acquired. For example, when only the finest positive pattern light intensity image is acquired for acquiring the third distance data, the third distance data may be calculated from a newly captured positive pattern light intensity image and the negative pattern light intensity image used for calculating the second distance data. On the other hand, when the negative pattern light intensity image is acquired, the third distance data may be calculated by using the positive pattern light intensity image used for calculating the second distance data. Thus, a similar effect can be obtained with an even smaller number of pattern light beams to be projected. The measurement method to which the present invention can be applied is not limited to this method. For example, the present invention can be applied to a multi-slit light projection method in which the peak position of the image luminance value corresponds to the measurement line position as illustrated in FIG. 12. In the multi-slit light projection method, pattern images illustrated in FIGS. 13A to 13G are projected to acquire the first distance data. The pattern image illustrated in FIG. 13G is a pattern image for calculating measurement lines. The pattern images illustrated in FIGS. 13A to 13F are a spatially coded pattern image used for identifying an order of each of the measurement lines in FIG. 13G. With the 4-bit spatially coded pattern images illustrated in FIGS. 13A to 13F, 16 measurement lines can be identified.

When the region that has changed as a result of the pick-up operation is detected, only the pattern illustrated in FIG. 13G required for calculating the measurement line positions is projected in step S107. A positional displacement amount between the measurement line position at the time when the first distance data is measured and the measurement line position at the time when the changed region is detected is calculated. The present invention can be implemented with the portion with a large positional displacement amount detected as the changed region.

In a second exemplary embodiment, a spatial code value is used for detecting the changed region. The spatial code values are calculated when the first distance data is acquired and when the changed region is detected, and the spatial code values are compared with each other. Typically, the pattern light images of all the bits are required for obtaining the spatial code values. Thus, when the image capturing is normally performed, a short image capturing time cannot be achieved because the projection and the image capturing need to be performed for the number of times that is the same as the number of patterns used for the first distance data. In the present exemplary embodiment, the spatial code values are calculated by capturing only an image of a predetermined bit obtained when the changed region is detected and using the images of bits, other than the predetermined bit, captured when the first distance data is acquired. Thus, the changed region can be detected with a shorter image capturing time.

An apparatus configuration in the present exemplary embodiment is similar to the apparatus configuration according to the first exemplary embodiment illustrated in FIG. 1.

Figure 2:
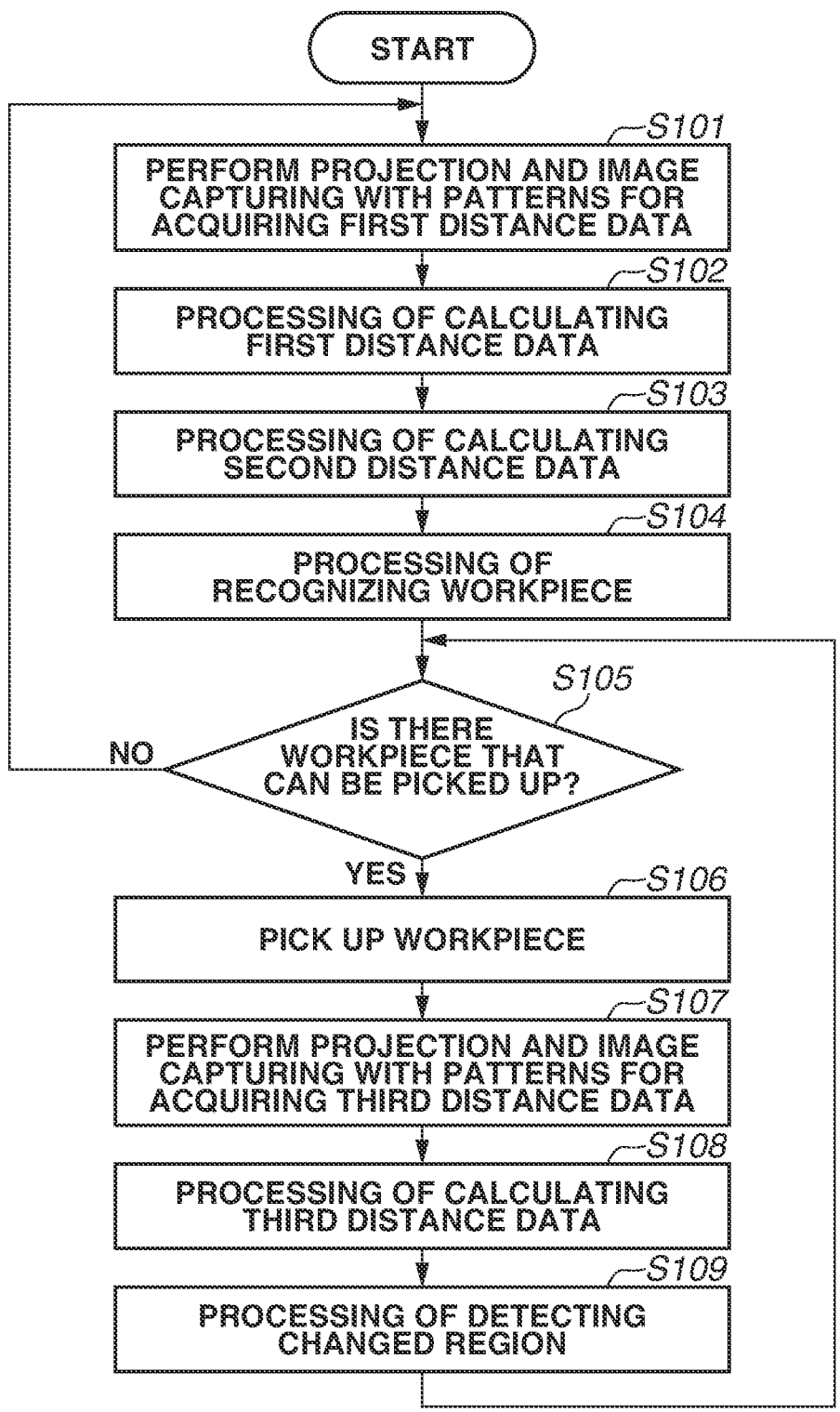
FIG. 2 is a diagram illustrating a control method according to the present invention.

A control method according to the present exemplary embodiment is only different from the control method according to the first exemplary embodiment illustrated in FIG. 2 in four points, that is, the processing of calculating the second distance data in step S103, the processing of projecting the pattern for acquiring the third distance data and performing image capturing in step S107, the processing of calculating the third distance data in step S108, and the processing of detecting the changed region in step S109.

A processing method according to the second exemplary embodiment is described in detail below.

The processing in steps S101 and S102 is the same as that in the first exemplary embodiment and thus will not be described.

In step S103, the distance calculation unit 7d calculates the second distance data from the pattern light intensity images acquired in step S101. This second distance data calculated in step S103 is referred to as second distance data'.

Figure 14:
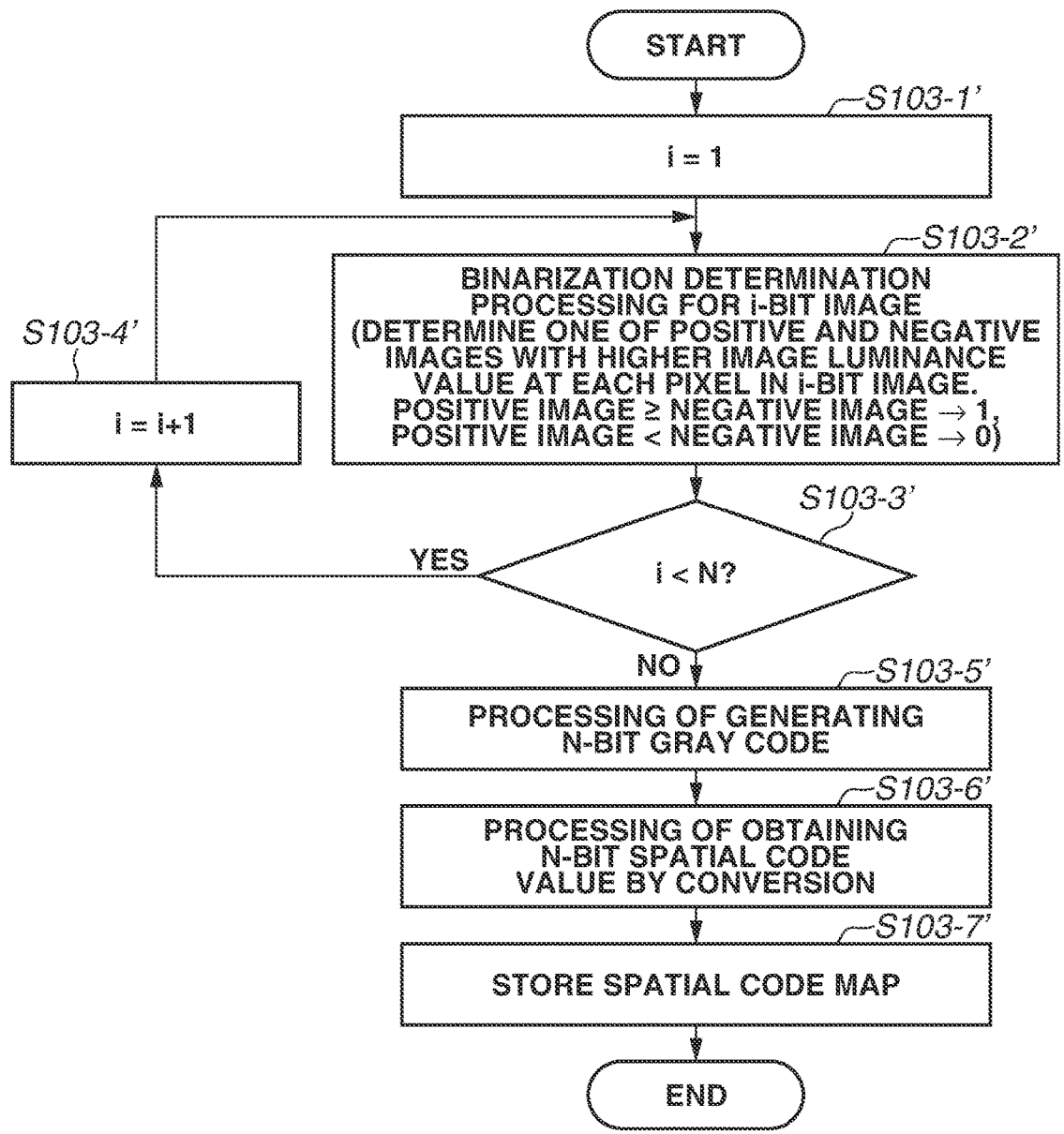
FIG. 14 is a diagram illustrating a method of calculating the second distance data according to a second exemplary embodiment.

In the present exemplary embodiment, the second distance data' is a two-dimensional spatial code map that is a two-dimensional map of the spatial code values corresponding to respective camera image coordinates. That is, processing of calculating the spatial code value, described with reference to FIG. 14, is executed in step S103.

In step S103-1', the distance calculation unit 7d sets a control variable i to 1, and the processing proceeds to step S103-2'.

In step S103-2', the distance calculation unit 7d executes binarization determination processing for an i-bitimage. More specifically, whether the positive image has an image luminance value which is not smaller than that of the negative image is determined for each pixel in the i-bit image. A pixel where the positive image has an image luminance value which is not smaller than that of the negative image is set to "1". On the other hand, a pixel where the positive image has an image luminance value smaller than that of the negative image is set to "0". When the binarization determination processing is completed for all the pixels in the i-bit image, the processing proceeds to step S103-3'.

In step S103-3', the distance calculation unit 7d determines whether the control variable i is smaller than N representing the number of bits in spatially coded patterns. Here, N is four because the projected patterns illustrated in FIG. 3A to 3J is used. When the result of the determination is "yes" (yes in step S103-3'), the processing proceeds to step S103-4'. In step S103-4', the distance calculation unit 7d increments the control variable i by one. When the result of the determination is "no" (no in step S103-3'), it means that the binarization determination has been completed for all the 1 to 4-bit images, and thus the processing proceeds to step S103-5'.

In step S103-5', the distance calculation unit 7d executes processing of generating a 4-bit Gray code. As illustrated in FIG. 4, binary codes of the 1 to 4-bit images are combined for each pixel, and thus the Gray code of each pixel is generated.

In step S103-6', the distance calculation unit 7d executes processing of converting the 4-bit Gray code into a 4-bit spatial code value.

In step S103-7', the distance calculation unit 7d stores a spatial code map, obtained as a result of calculating the spatial code values over the entire image in step S103-6', in the storage unit 7c.

A flow of the processing in step S103 is as described above.

In steps S104, S105, and S106, which are the same as those in the first exemplary embodiment and thus will not be described in detail, the workpiece recognition unit 7e executes the processing of recognizing the workpiece 4 that can be picked up, and the robot 9 picks up the workpiece 4 thus recognized.

In step S107, the projection unit 11 projects the pattern light beams, for acquiring the third distance data, onto the workpieces 4, and the image capturing unit 12 performs the image capturing. In the present exemplary embodiment, two types of second finest pattern light beams, that is, the respective 3-bit positive and negative pattern light beams, illustrated in FIGS. 3D and 3I are projected. In the present exemplary embodiment, an example is described where the second finest patterns are used. However, the pattern that can be used is not limited to this, and a pattern with a different level of fineness may be used in accordance with a size of the changed region to be detected and a detection sensitivity.

In step S108, the distance calculation unit 7d calculates the third distance data from the pattern light intensity images acquired in step S107 and the pattern light intensity images acquired in step S101. The third distance data calculated in step S108 is referred to as third distance data'.

The processing of calculating the third distance data in step S108 involves calculation of the spatial code values using the pattern light intensity images and is the same as that in step S103 described with reference to FIG. 14. Some pattern light intensity images used for the calculation are captured at a timing that is different from that for the other pattern light intensity images.

As illustrated in FIG. 18, all the pattern light intensity images at the point of step S103 are images captured in step S101 before the pick-up operation is performed. In step S108, images other than the 3-bit images are images captured in step S101 before the pick-up operation is performed, and the 3-bit images are images captured in step S107 after the pick-up operation. With this configuration in which only images of a certain bit are captured at a different timing, when the state of the randomly piled workpieces 4 changes from that captured in step S101 to that captured in step S107, only the changed region involves the difference in the spatial code value to be calculated. This difference in the special code value is used as a reference for detecting the changed region in step S109.

Figure 15:
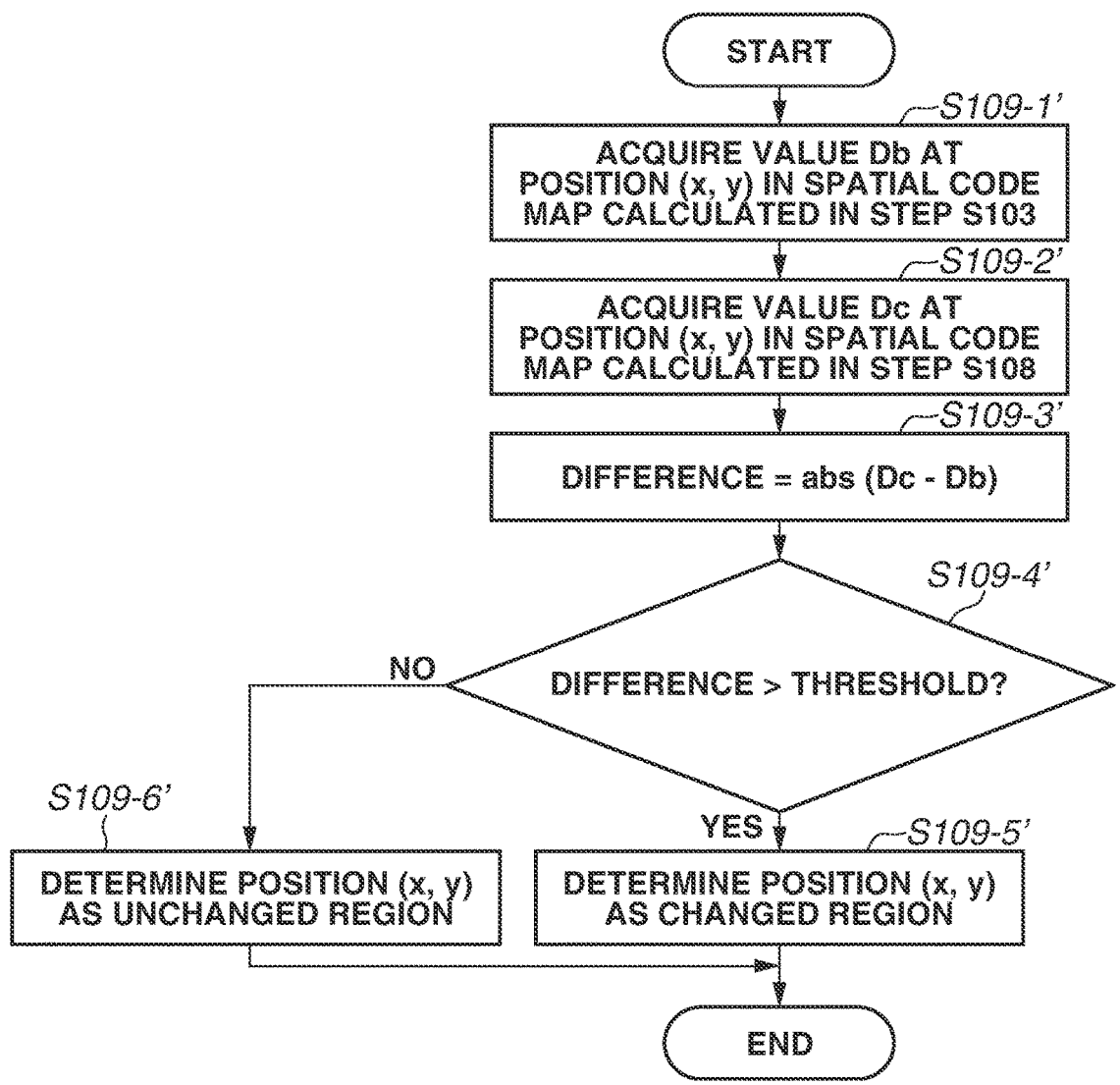
FIG. 15 is a diagram illustrating a method of detecting a change according to the second exemplary embodiment.
Figure 16:
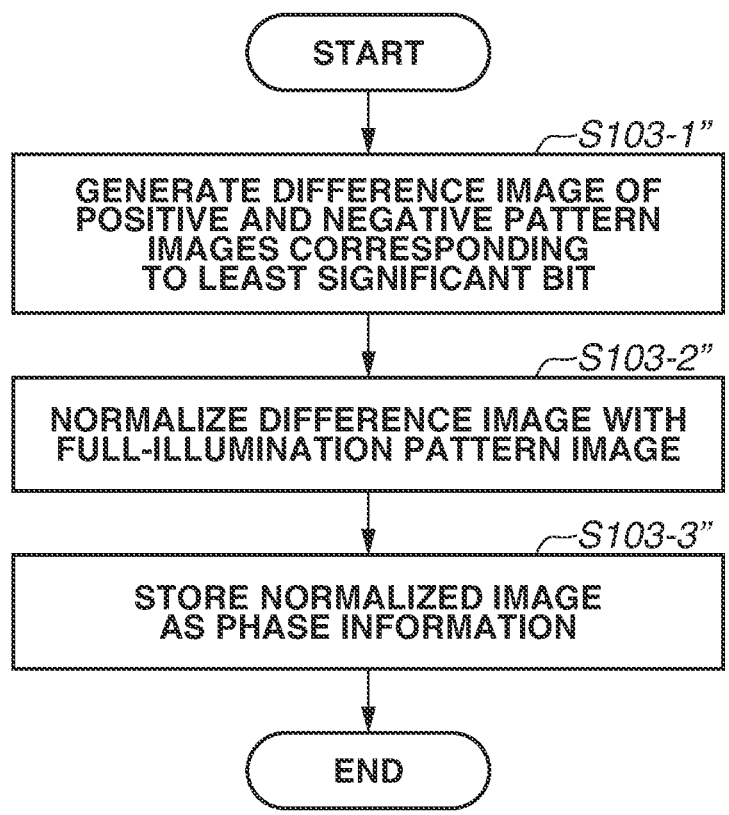
FIG. 16 is a diagram illustrating a method of calculating the second distance data according to a third exemplary embodiment.

In step S109, the workpiece recognition unit 7e detects the change in the randomly piled workpieces 4, as a result of the pick-up operation, from the second distance data' generated in step S103 and the third distance data' generated in step S108. FIG. 15 illustrates a method of detecting the change according to the present exemplary embodiment.

In step S109-1', the workpiece recognition unit 7e acquires a spatial code value Db at a position (x,y) in the second distance data' (spatial code map) calculated in step S103.

In step S109-2', the workpiece recognition unit 7e acquires a spatial code value Dc at the position (x,y) in the third distance data' (spatial code map) calculated in step S108.

In step S109-3', the workpiece recognition unit 7e calculates an absolute value of the difference between the value Db acquired in step S109-1', and the value Dc acquired in step S109-2', and sets the absolute value thus obtained as a difference value at the position (x,y).

In step S109-4', the workpiece recognition unit 7e determines whether the difference value is larger than a threshold. When the difference value is larger than the threshold (yes in step S109-4'), the processing proceeds to step S109-5'. In step S109-5', the workpiece recognition unit 7e determines that the position (x,y) is the changed region. On the other hand, when the difference value is equal to or smaller than the threshold (no in step S109-4'), the processing proceeds to step S109-6'. In step S109-6', the workpiece recognition unit 7e determines that the position (x,y) is the unchanged region. The threshold used in step S109-4' is preferably set to be equal to or larger than the change in the spatial code that is caused by the change in the pattern light projected in step S107 determined in accordance with the size of the changed region to be detected and the detection sensitivity. For example, the threshold is set to be a value that is equal or larger than the change in the spatial code caused by the change in the pattern light projected in step S107 and larger than the error of the spatial code in the second distance data due to the noise and the like of the image sensor 6.

Whether the change has occurred can be determined over the entire range of the image by executing the processing of steps S109-1' to S109-6' on all the pixels in the spatial code map.

When the detection of the changed range in step S109 is completed, the processing returns to step S105 in which the workpiece recognition unit 7e determines whether there is a workpiece 4 that can be picked up. This processing is described in the first exemplary embodiment with reference to FIGS. 10A to 10C and 11A to 11C, and thus will not be described in detail.

As described above, in the present exemplary embodiment, the change can be detected more accurately with the change amount detected for all the pixels.

In a third exemplary embodiment, phase information of a periodical projection pattern light beam is used as the second distance data for detecting the changed region. The phase information is calculated when the first distance data is acquired and when the changed region is detected, and these pieces of information are compared with each other. At least three patterns need to be projected to obtain the phase information. The three pattern light images are larger in the number by one than the images in the first and the second exemplary embodiments, but are smaller in the number than the pattern light images required for measuring the first distance data. Thus, the image capturing time can be shortened compared with a case where the first distance data is acquired every time, whereby a shorter tact time can be achieved. All things considered, the present exemplary embodiment is advantageous in that a changed amount can be detected for all the pixels, in spite of the increase in the number of images to be captured by one compared with the first exemplary embodiment in which the boundary position between the light and the dark portions is obtained.

An apparatus configuration in the present exemplary embodiment is similar to the apparatus configuration according to the first exemplary embodiment illustrated in FIG. 1.

A control method according to the present exemplary embodiment is only different from the control method according to the first exemplary embodiment illustrated in FIG. 2 in four points, that is, the processing of calculating the second distance data in step S103, the processing of projecting the pattern for acquiring the third distance data and performing image capturing in step S107, the processing of calculating the third distance data in step S108, and the processing of detecting the changed region in step S109.

A processing method according to the third exemplary embodiment is described in detail below.

The processing in steps S101 and S102 is the same as that in the first exemplary embodiment and thus will not be described.

In step S103, the distance calculation unit 7d calculates the second distance data from the pattern light intensity images acquired in step S101, by using three types of pattern images, that is, the respective 4-bit positive and the negative pattern images, illustrated in FIGS. 3E and 3J, and a full illumination pattern image illustrated in FIG. 3A. The second distance data calculated in step S103 is referred to as second distance data".

The second distance data" according to the present exemplary embodiment is the phase information of the periodical projection pattern light beam. Thus, in step S103, the distance calculation unit 7d executes processing of calculating the phase information described with reference to FIG. 16.

In step S103-1", the distance calculation unit 7d generates a difference image between the 4-bit positive and negative pattern images.

Then, in step S103-2", the distance calculation unit 7d normalizes the difference image generated in step S103-1", with the full illumination pattern image. More specifically, the image luminance value of the difference image is divided by the image luminance value of the full illumination image. In the difference image, the amplitude of the waveform fluctuates in accordance with the magnitude of the reflectance of the measurement target object. This influence of the reflectance is eliminated by dividing the luminance value of the difference image by the image luminance value of the full illumination image representing the reflectance of the measurement target object, whereby the only the phase information of the waveform is extracted.

In step S103-3", the distance calculation unit 7d stores the normalized image generated in step S103-2", as the phase information in the storage unit 7c.

A flow of the processing in step S103 is as described above.

In steps S104, S105, and S106, which are the same as those in the first exemplary embodiment and thus will not be described in detail, the workpiece recognition unit 7e executes the processing of recognizing the workpiece 4 that can be picked up, and the robot 9 picks up the workpiece 4 thus recognized.

In step S107, the projection unit 11 projects the pattern images, for acquiring the second distance data, onto the workpieces 4, and the image capturing unit 12 performs the image capturing. In the present exemplary embodiment, the projection and the image capturing are performed with three types of pattern images that are the same as those used in step S103.

In step S108, the distance calculation unit 7d calculates the third distance data from the pattern light intensity images acquired in step S107. The third distance data calculated in step S108 is referred to as third distance data". The processing of calculating the third distance data" in step S108 involves calculation of the phase information using the pattern light intensity images and is the same as that in step S103 described with reference to FIG. 16.

Figure 17:
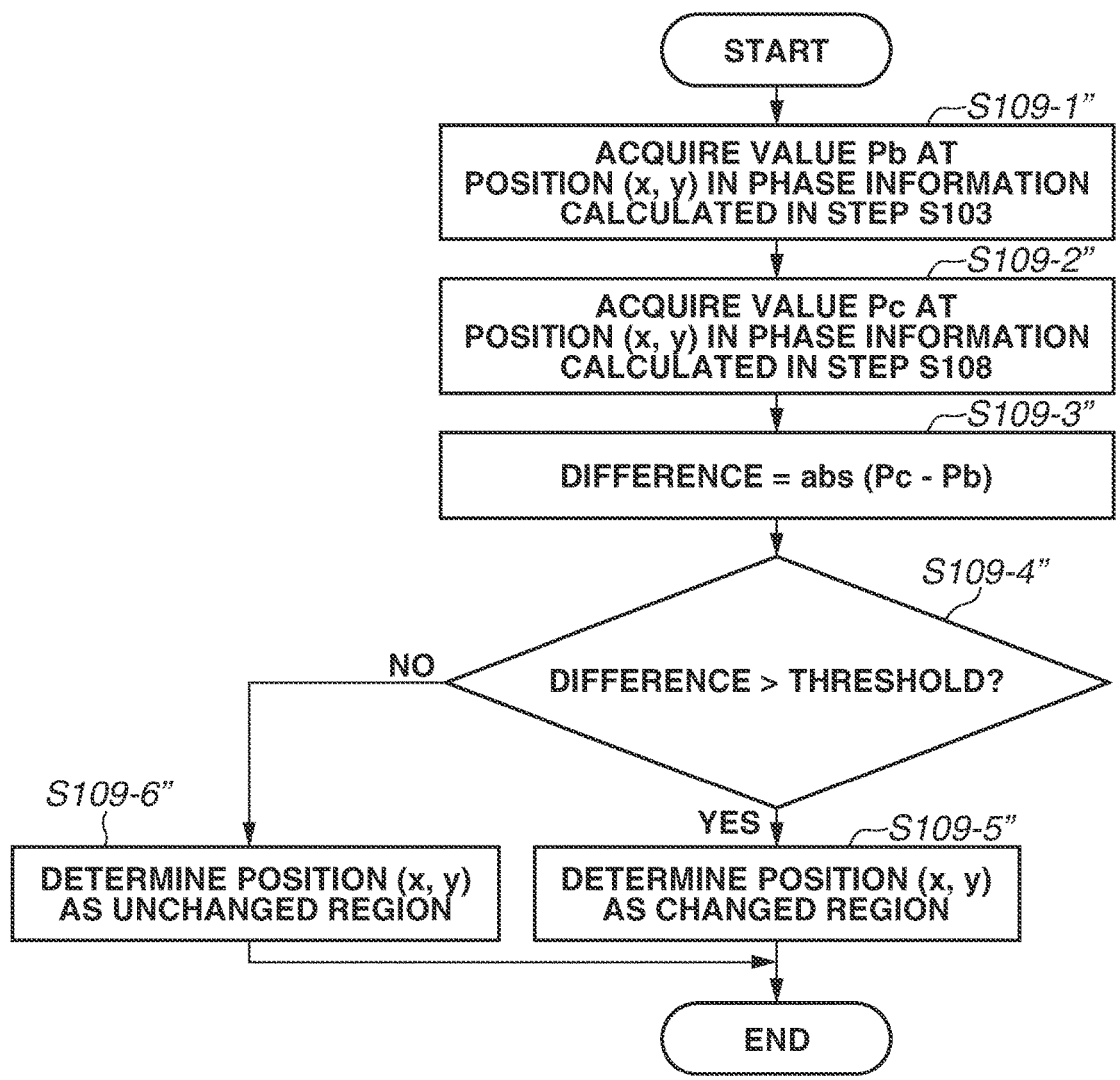
FIG. 17 is a diagram illustrating a method of detecting the change according to the third exemplary embodiment.
Figure 19:
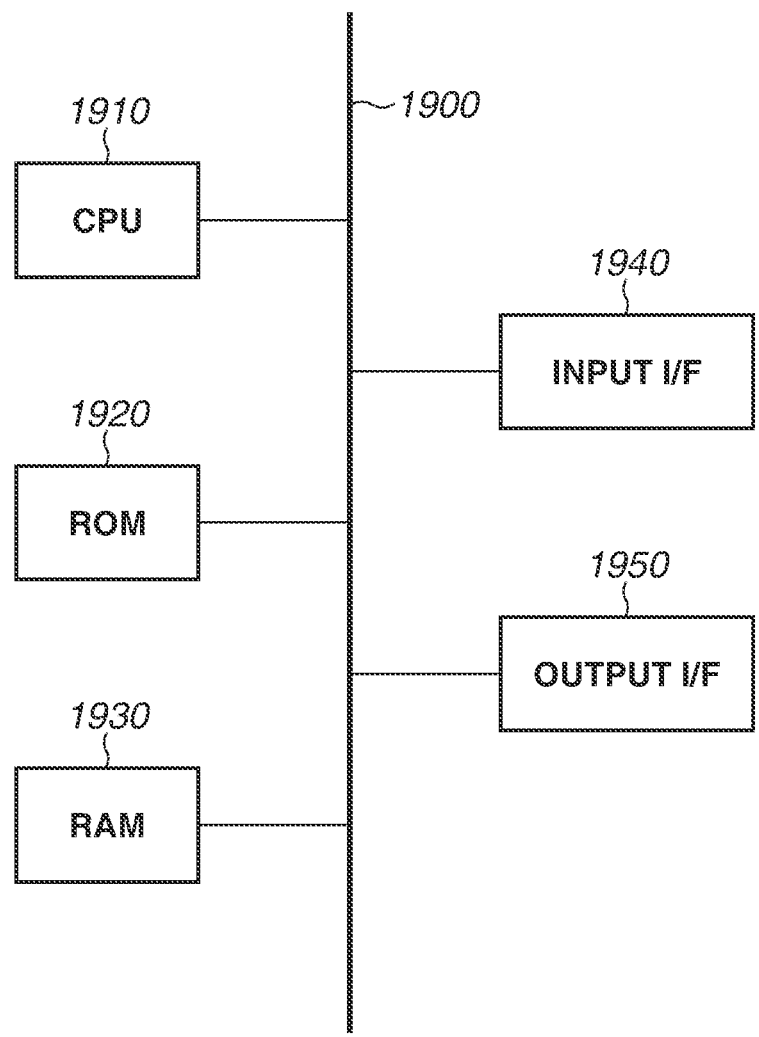
FIG. 19 is a diagram illustrating an example of a hardware configuration of an information processing apparatus according to the present invention.

In step S109, the workpiece recognition unit 7e detects the change in the randomly piled workpieces 4, as a result of the pick-up operation, from the second distance data" generated in step S103 and the third distance data" generated in step S108. The phase information changes in accordance with the change in the height of the target object. That is, when the random pile state changes as a result of the pick-up operation and thus the change in the height occurs, the phase information changes. All things considered, by calculating the difference in the phase information between the same pixels, the change in the height, that is, the change in the random pile state can be detected. FIG. 17 illustrates a method of detecting the change according to the present exemplary embodiment.

In step S109-1", the workpiece recognition unit 7e acquires a phase value Pb at a position (x,y) in the second distance data" (phase information) calculated in step S103.

In step S109-2", the workpiece recognition unit 7e acquires a phase value Pc at the position (x,y) in the third distance data" (phase information) calculated in step S108.

In step S109-3", the workpiece recognition unit 7e calculates an absolute value of the difference between the value Pb acquired in step S109-1", and the value Pc acquired in step S109-2", and sets the absolute value thus obtained as a difference value at the position (x,y).

In step S109-4", the workpiece recognition unit 7e determines whether the difference value is larger than a threshold. When the difference value is larger than the threshold (yes in step S109-4"), the processing proceeds to step S109-5". In step S109-5", the workpiece recognition unit 7e determines that the position (x,y) is the changed region. On the other hand, when the difference value is equal to or smaller than the threshold (no in step S109-4"), the processing proceeds to step S109-6". In step S109-6", the workpiece recognition unit 7e determines that the position (x,y) is the unchanged region. The threshold used in step S109-4" is preferably set in such a manner that only the change in the phase caused by picking up the workpiece 4 is recognized as the change. More specifically, the threshold is set in such a manner that the change in the phase caused by the change in the image luminance value due to the noise of the image sensor 6 and the like is not detected as the change, and that the change in the phase caused by picking up the workpiece 4 is detected as the change. For example, the threshold is set to be a value that is equal to or larger than the amount of phase change in a smallest value of each side of a circumscribed rectangle of the randomly piled workpieces 4 and larger than the error of the phase in the second distance data due to the noise and the like of the image sensor 6.

Whether the change has occurred can be determined over the entire range of the image by executing the processing from steps S109-1" to S109-6" on all the pixels in the phase information.

When the detection of the changed range in step S109 is completed, the processing returns to step S105 in which the workpiece recognition unit 7e determines whether there is a workpiece 4 that can be picked up. This processing is described in the first exemplary embodiment with reference to FIGS. 10A to 10C and 11A to 11C, and thus will not be described in detail.

As described above, in the present exemplary embodiment, the change can be detected more accurately with the change amount detected for all the pixels, although needing an increase in the number of captured images by one, compared with the first exemplary embodiment.

With the present invention, the change in the position and the orientation of a workpiece in a height direction can also be detected.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-067067, filed Mar. 27, 2015, which is hereby incorporated by reference herein in its entirety.

What is claimed is:

1. An information processing apparatus comprising:
one or more processors; and
memory storing instructions that, when executed by the one or more processors, cause the information processing apparatus to perform operations including:
executing a first projection processing of causing a projection unit to project a pattern light, that includes light and dark portions, onto a plurality of objects,
executing a first image capturing processing of causing an image capturing unit to capture an image of the plurality of objects while the pattern light is being projected by the first projection processing,
obtaining a distance data based on a first position of a boundary between the light and dark portions of the projected pattern light in a captured image obtained by the first image capturing processing,
executing after the obtaining the distance data, a second projection processing of causing the projection unit to project the pattern light onto a plurality of objects,
executing a second image capturing processing of causing the image capturing unit to capture an image of the objects while the pattern light is being projected by the second projection processing,
obtaining a second position of a boundary between the light and dark portion of the projected pattern light in a captured image obtained by the second image capturing processing, and
detecting, based on a reference boundary position corresponding to the first position of the boundary and a target boundary position corresponding to the second position of the boundary, a region corresponding to a change between the captured image obtained by the first image capturing processing and the captured image obtained by the second image capturing processing.

2. The information processing apparatus according to claim 1, wherein executing the instructions further causes the information processing apparatus to perform operations including:
comparing the reference boundary position with the target boundary position, and
detecting the region based on a result obtained by the comparing.

3. The information processing apparatus according to claim 1, wherein, when a difference between the reference boundary position and the target boundary position that has been detected is larger than a threshold, the region including the target boundary position in the captured image obtained in the second image capturing processing is detected.

4. The information processing apparatus according to claim 1,
wherein executing the instructions further causes the information processing apparatus to perform operations including causing the projection unit to project, in the first projection processing, a plurality of patterns, and
wherein each of the plurality of patterns includes light and dark portions, and to project, in the second projection processing, only a first pattern of the plurality of patterns.

5. The information processing apparatus according to claim 4, wherein the first pattern is a pattern in which at least one of the light and dark portions has a smallest width in the plurality of patterns.

6. The information processing apparatus according to claim 5,
wherein the reference boundary position is a position corresponding to a boundary between the light and dark portions in the first pattern in which at least one of the light and dark portions has the smallest width in the plurality of patterns, and
wherein the target boundary position is a position corresponding to the boundary between the light and dark portions in the first pattern.

7. The information processing apparatus according to claim 1, wherein executing the instructions further causes the information processing apparatus to perform operations including storing the reference boundary position.

8. The information processing apparatus according to claim 1, further comprising a controller configured to cause a holding unit to hold a target object of the plurality of objects based on the distance data,
wherein the region is a region with a change as a result of a holding operation by the holding unit based on the distance data obtained from the position of the boundary in the captured image obtained in the first image capturing processing.

9. The information processing apparatus according to claim 8, wherein the controller further is configured to cause the holding unit to hold one target object of the plurality of objects based on the distance data before the second projection processing, and then cause the holding unit to hold another target object of the plurality of objects outside the region including the change after the detecting.

10. The information processing apparatus according to claim 9, wherein executing the instructions further causes the information processing apparatus to perform operations including obtaining a distance data based on the second position when there is no target object that is able to be held by the holding unit outside the region including the change that has been detected.

11. The information processing apparatus according to claim 1, wherein the plurality of objects is randomly arranged.

12. The information processing apparatus according to claim 1, wherein executing the instructions further causes the information processing apparatus to perform operations including detecting a change of arrangement of the object between the first image capturing processing and the second image capturing processing among the repeating cycles based on the detected region.

13. The information processing apparatus according to claim 1,
wherein, when there is a target object among the plurality of objects outside the region including the change,
(i) executing the instructions further causes the information processing apparatus to perform operations including not obtaining a distance data based on the second position of a boundary between the light and dark portions of the projected pattern light in a captured image obtained by the second image capturing processing, and
(ii) executing the instructions further causes the information processing apparatus to perform operations including outputting a position of the target object to a controller for a holding unit.

14. The information processing apparatus according to claim 1,
wherein executing the instructions further causes the information processing apparatus to perform operations including obtaining positions of the plurality of objects based on the distance data,
wherein detecting includes performing detecting after a holding unit holds a first target object among the plurality of objects based on the obtained positions of the plurality of objects,
wherein, when there is a second target object among the plurality of objects of which obtained position is outside the region including the change, executing the instructions further causes the information processing apparatus to perform operations including outputting a position of the second target object.

15. An information processing apparatus comprising:
one or more processors; and
memory storing instructions that, when executed by the one or more processors, cause the information processing apparatus to perform operations including:
executing a first projection processing of causing a projection unit to project a coded pattern light, that includes light and dark portions, onto a plurality of objects,
executing a first image capturing processing of causing an image capturing unit to capture an image of the plurality of objects while the coded pattern light is being projected by the first projection processing,
obtaining a distance data based on a first code value of the projected coded pattern light in a captured image obtained by the first image capturing processing,
executing, after the obtaining the distance data, a second projection processing of causing the projection unit to project the coded pattern light onto a plurality of objects,
executing a second image capturing processing of causing the image capturing unit to capture an image of the objects while the coded pattern light is being projected by the second projection processing,
obtaining a second code value of the projected coded pattern light in a captured image obtained by the second image capturing processing, and
detecting, based on the first code value and the second code value, a region corresponding to a change between the captured image obtained by the first image capturing processing and the captured image obtained by the second image capturing processing.

16. The information processing apparatus according to claim 15, wherein executing the instructions further causes the information processing apparatus to perform operations including comparing the first code value and the second code value for each predetermined region, and determining, as the region, a region in which a difference value between the first code value and the second code value is larger than a threshold.

17. The information processing apparatus according to claim 15, wherein the second code value is determined based on both the captured image obtained by the first image capturing processing and the captured image obtained by the second image capturing processing.

18. The information processing apparatus according to claim 15, wherein executing the instructions further causes the information processing apparatus to perform operations including causing the projection unit to project, in the first projection processing, a plurality of patterns, wherein each of the plurality of patterns includes light and dark portions, and to project, in the second projection processing, only a first pattern of the plurality of patterns.

19. The information processing apparatus according to claim 18, wherein the first pattern is a pattern in which at least one of the light and dark portions has a smallest width in the plurality of patterns.

20. The information processing apparatus according to claim 18,
wherein the first code value is determined based on images captured when the plurality of respective patterns is projected in the first projection processing, and
wherein the second code value is determined based on the image captured with a pattern, other than the first pattern, in the plurality of patterns projected in the first projection processing, and an image obtained with the first pattern projected in the second projection processing.

21. The information processing apparatus according to claim 15, wherein executing the instructions further causes the information processing apparatus to perform operations including storing the first code value.

22. The information processing apparatus according to claim 15, further comprising a controller configured to cause a holding unit to hold a target object of the plurality of objects based on the distance data,
wherein the region is a region with a change as a result of a holding operation by the holding unit based on the distance data obtained from the position of the projected coded pattern light in the captured image obtained in the first image capturing processing.

23. The information processing apparatus according to claim 22, wherein the controller is configured to cause the holding unit to hold one target object of the plurality of objects based on the distance data before the second projection processing, and then cause the holding unit to hold another target object of the plurality of objects outside the region that including the change has been detected after the detecting.

24. The information processing apparatus according to claim 23, wherein executing the instructions further causes the information processing apparatus to perform operations including causing the projection unit to project the coded pattern light when there is no target object that is able to be held by the holding unit outside the region including the change that has been detected.

25. The information processing apparatus according to claim 15, wherein the plurality of objects is randomly arranged.

26. The information processing apparatus according to claim 15, wherein executing the instructions further causes the information processing apparatus to perform operations including detecting a change of arrangement of the object between the first image capturing processing and the second image capturing processing among the repeating cycles based on the detected changed region.

27. The information processing apparatus according to claim 15,
wherein, when there is a target object among the plurality of objects outside the region including the change,
(i) executing the instructions further causes the information processing apparatus to perform operations including not obtaining a distance data based on the second code value of the projected coded pattern light in a captured image obtained by the second image capturing processing, and
executing the instructions further causes the information processing apparatus to perform operations including outputting a position of the target object to a controller for a holding unit.

28. The information processing apparatus according to claim 15,
wherein executing the instructions further causes the information processing apparatus to perform operations including obtaining positions of the plurality of objects based on the distance data,
wherein detecting includes performing detecting after a holding unit holds a first target object among the plurality of objects based on the obtained positions of the plurality of objects,
wherein, when there is a second target object among the plurality of objects of which obtained position is outside the region including the change, executing the instructions further causes the information processing apparatus to perform operations including outputting a position of the second target object.

29. An information processing method for an information processing apparatus, the information processing method comprising:
executing a first projection processing of causing a projection unit to project a pattern light, that includes light and dark portions, onto a plurality of objects;
executing a first image capturing processing of causing an image capturing unit to capture an image of the plurality of objects while the pattern light is being projected by the first projection processing;
obtaining a distance data based on a first position of a boundary between the light and dark portions of the projected pattern light in a captured image obtained by the first image capturing processing;
executing after the obtaining the distance data, a second projection processing of causing the projection unit to project the pattern light onto a plurality objects;
executing a second image capturing processing of causing the image capturing unit to capture an image of the objects while the pattern light is being projected by the second projection processing;
obtaining a second position of a boundary between the light and dark portions of the projected pattern light in a captured image obtained by the second image capturing processing; and
detecting, based on a reference boundary position corresponding to the first position of the boundary and a target boundary position corresponding to the second position of the boundary, a region corresponding to a change between the captured image obtained by the first image capturing processing and the captured image obtained by the second image capturing processing.

30. An information processing method for an information processing apparatus, the information processing method comprising:
executing a first projection processing of causing a projection unit to project a coded pattern light, that includes light and dark portions, onto a plurality of objects;
executing a first image capturing processing of causing an image capturing unit to capture an image of the plurality of objects while the coded pattern light is being projected by the first projection processing;
obtaining a distance data based on a first code value of the projected coded pattern light in a captured image obtained by the first image capturing processing;
executing, after the obtaining the distance data, a second projection processing of causing the projection unit to project the coded pattern light onto a plurality of objects;
executing a second image capturing processing of causing the image capturing unit to capture an image of the objects while the coded pattern light is being projected by the second projection processing;
obtaining a second value of the projected coded pattern light in a captured image obtained by the second image capturing processing; and
detecting, based on the first code value and the second code value, a region corresponding to a change between the captured image obtained by the first image capturing processing and the captured image obtained by the second image capturing processing.

31. A non-transitory storage medium storing a program to cause an information processing apparatus to perform an information processing method, the information processing method comprising:
executing a first projection processing of causing a projection unit to project a pattern light, that includes light and dark portions, onto a plurality of objects;
executing a first image capturing processing of causing an image capturing unit to capture an image of the plurality of objects while the pattern light is being projected by the first projection processing;
obtaining a distance data based on a first position of a boundary between the light and dark portions of the projected pattern light in a captured image obtained by the first image capturing processing;
executing after the obtaining the distance data, a second projection processing of causing the projection unit to a project the pattern light onto a plurality of objects;
executing a second image capturing processing of causing the image capturing unit to capture an image of the objects while the pattern light is being projected by the second projection processing;

obtaining a second position of a boundary between the light and dark portions of the projected pattern light in a captured image obtained by the second image capturing processing; and detecting, based on a reference boundary position corresponding to the first position of the boundary and a target boundary position corresponding to the second position of the boundary, a region corresponding to a change between the captured image obtained by the first image capturing processing and the captured image obtained by the second image capturing processing.

32. A non-transitory storage medium storing a program to cause an information processing apparatus to perform an information processing method, the information processing method comprising:

executing a first projection processing of causing a projection unit to project a coded pattern light, that includes light and dark portions, onto a plurality of objects;

executing a first image capturing processing of causing an image capturing unit to capture an image of the plurality of objects while the coded pattern light is being projected by the first projection processing;

obtaining a distance data based on a first code value of the projected coded pattern light in a captured image obtained by the first image capturing processing;

executing, after the obtaining the distance data, a second projection processing of causing the projection unit to project the coded pattern light onto a plurality of objects;

executing a second image capturing processing of causing the image capturing unit to capture an image of the objects while the coded pattern light is being projected by the second projection processing;

obtaining a second code value of the projected coded pattern light in a captured image obtained by the second image capturing processing; and detecting, based on the first code value and the second code value, a region corresponding to a change between the captured image obtained by the first image capturing processing and the captured image obtained by the second image capturing processing.

* * * * *